United States Patent Office 3,391,128
Patented July 2, 1968

3,391,128
POLYMERIC AROMATIC ESTERS OF
DITHIOSULFUROUS ACID
Carl E. Handlovits, Midland, Mich., assignor to The Dow
Chemical Company, Midland, Mich., a corporation of
Delaware
No Drawing. Filed July 23, 1964, Ser. No. 384,803
5 Claims. (Cl. 260—79)

ABSTRACT OF THE DISCLOSURE

Novel polymeric aromatic esters of dithiosulfurous acid are prepared by reaction of thionyl chloride and aromatic polythiols of Formula I or II:

R(SH)$_n$     R(CH$_2$SH)$_n$
(I)            (II)

where R is an aromatic group and $n$ is 1.5–3.0. These dithiosulfurous esters characterized by recurring structural units of Formula III

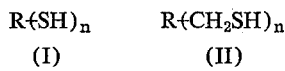

(III)

where R' is the aromatic or methylenearomatic moiety of the polythiol, have enhanced thermal stability and are useful as adhesives and laminating resins.

Condensation polymers of polythiols have been previously reported. For example, Flory describes in U.S. Patent 2,510,567 the synthesis of polythioesters from dimercaptans and such dibasic acid chlorides as adipyl chloride or terephthalic chloride. Stone reported in U.S. Patent 3,053,816 condensation of C$_4$–C$_6$ alkanedithiols and thionyl chloride to give rubbery polymers having an empirical composition of (C$_x$H$_{2x}$S$_{2.5}$)$_n$ wherein $x$ is the number of carbon atoms of the initial dithiol. However, resinous polymeric dithiosulfites as described herein have not been previously known.

It has now been found that valuable resinous polymeric aromatic esters of dithiosulfurous acid can be obtained by condensation of aromatic polythiols with thionyl chloride in the presence of a suitable HCl acceptor such as pyridine. While preparation of high molecular weight, linear condensation polymers requires a pure dithiol, useful adhesives and laminating resins can also be prepared from mixtures. With para-aromatic dithiols, high molecular weight linear polymers can be obtained which have higher melting points and greater thermal stability than the corresponding sulfurous acid esters. meta-Aromatic dithiols can also be used, but ortho-dithiols tend to give low molecular weight cyclic products rather than the desired polymeric dithiosulfites. Although the preparation of high molecular weight, linear polymers requires a pure dithiol, useful adhesives and laminates can also be obtained from mixtures of aromatic polythiols containing from an average of 1.5 to 3.0 thiol (—SH) or mercaptomethyl (—CH$_2$SH) groups per aromatic moiety. The cross-linked polymer obtained from thiols having an average of more than 2 thiol groups per aromatic moiety has a greater solvent resistance often desirable for specialized adhesive compositions.

More specifically the aromatic thiols useful in this invention are characterized by Formula I or II:

R(SH)$_n$     R(CH$_2$SH)$_n$
(I)            (II)

where $n$ is 1.5–3.0, the thiol groups are in non-adjacent positions on the aromatic moiety, and R is selected from the group consisting of:

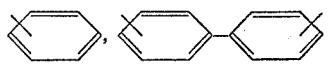

and

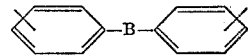

wherein B is one of —O—, —S—, —SO$_2$—, —CH$_2$—, and —C(CH$_3$)$_2$—.

Many suitable aromatic polythiols of Formulas I and II are known compounds. Others can be syntheisized by conventional methods. For example, 4,4'-oxybisthiophenol (I, R = 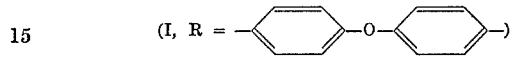 —)

is prepared by chlorosulfonation of diphenyl ether followed by reduction. Mercaptomethyl derivatives can be synthesized by reaction of a halomethyl aromatic compound, such as p-xylylene dichloride or 4,4'-bis(chloromethyl) diphenyl ether, with an alkali metal hydrosulfide or with thiourea followed by hydrolysis of the thiouronium salt to the corresponding thiol as described by Horn e.a. in U.S. Patent 2,969,387.

Typical polythiols of Formula I which can be used herein include p-benzenedithiol, m-benzenedithiol, 4,4'-dithiodiphenyl, 4,4'-oxybisthiophenol, 4,4'-dithiodiphenylmethane, 4,4'-dithiodiphenyldimethylmethane, 4,4'-dithiodiphenyl sulfide, 4,4'-dithiodiphenyl sulfone, as well as the corresponding 2,4'-dithiol derivatives Suitable polythiols of Formula II include p-xylylenedithiol, m-xylylenedithiol, 4,4'-bis(mercaptomethyl)diphenyl ether, 2,4'-bis(mercaptomethyl)diphenyl ether, 4,4'-bis(mercaptomethyl)diphenyl and 4,4'-bis(mercaptomethyl)diphenylmethane. Mixtures of 2 or more of these aromatic thiols can be used provided there is an average of 1.5 to 3.0 thiol groups per aromatic moiety. Particularly useful are poly(mercaptomethyl)diphenyl ethers prepared from a mixture of chloromethyldiphenyl ethers having an average of 1.5 to 3.0 chloromethyl groups per diphenyl ether moiety.

To achieve smooth condensation of the aromatic polythiols and thionyl chloride, it is advantageous to neutralize or remove the by product HCl as rapidly as it is formed. For this purpose use of a soluble heterocyclic or tertiary amine such as pyridine or tri-n-butylamine in the reaction mixture is particularly effective. A sufficient amount of the HCl acceptor should be used to react with all the HCl, i.e., at least 2 moles per mole of thionyl chloride and preferably a slight excess.

In the presence of a suitable HCl acceptor, the condensation of the aromatic polythiol and thionyl chloride is rapid and exothermic at room temperature. Thus a liquid diluent which is inert under the reaction conditions often is used to provide better mixing and heat transfer. Preferably the diluent should be a solvent for both the polythiol and the HCl acceptor. Particularly suitable are aromatic hydrocarbons such as benzene, toluene, and xylene, as well as chlorinated solvents such as methylenechloride, ethylenedichloride, carbon tetrachloride or chlorobenzene. Other liquid hydrocarbons such as hexane, isooctane, and various petroleum fractions are also useful.

Further control of the exothermic polymerization is achieved by gradual addition of the thionyl chloride to a mixture of aromatic polythiol, HCl acceptor and diluent. Under these conditions polymerization occurs readily in the liquid phase until an insoluble polymeric dithiosulfurous ester precipitates. The polymerization continues in the liquid phase as further thionyl chloride is added until the aromatic polythiol is consumed.

The reaction is conveniently carried out at room temperature and proceeds readily at temperatures in the range from −20° to 60° C. At room temperature the condensation is complete within a few minutes after a stoichiometric amount of thionyl chloride has been added. The precipitated polymeric dithiosulfite is recovered by filtration, washed with water or alcohol to remove any precipitated salt of the HCl acceptor and dried. Since the dithiosulfurous acid esters are slowly converted to the corresponding dithiosulfuric esters on exposure to air, it is necessary to minimize contact with air if a pure dithiosulfite polymer is desired. For many purposes surface oxidation of the hard granular particles of the polymeric dithiosulfite is not detrimental.

Because of the insolubility of the resinous polymers in most common solvents, the new dithiosulfites are most readily applied as an adhesive or laminating resin by spreading a thin layer of resin between the parts to be joined and then heating under pressure until the resin melts and spreads as a thin film. On cooling a strong adhesive bond is achieved with glass, stainless steel, and many other metals. Since the polymers are thermally stable at temperatures 30° to 50° above their melting point for moderate periods, the resin can also be applied as a melt.

The following examples are given to illustrate the compounds that may be prepared in accordance with the present invention, but are not to be construed as limiting the invention thereto. Unless otherwise specified all parts and percentages are by weight.

EXAMPLE I (A) To a stirred solution of 14.2 parts (0.1 mole) of p-benzenedithiol, 40 parts (0.5 mole) of pyridine and 450 parts of toluene was added slowly a solution of 11.8 parts (0.1 mole) of thionyl chloride in 45 parts of toluene. A white precipitate formed immediately. After complete addition of the thionyl chloride the mixture was stirred for 5 minutes and poured into a large excess of aqueous ethanol. The insoluble product was isolated, rinsed with aqueous alcohol and dried.

The hard, granular polymeric product was insoluble at room temperature in water and such organic solvents as alcohol, toluene, methylenechloride, tetrahydrofuran, tetrachloroethylene, and dimethyl sulfoxide. Infrared analysis of the resinous product after exposure to air showed bands as 7.45, 8.67 and 8.89μ indicating the presence of both dithiosulfurous

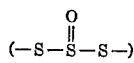

and dithiosulfuric

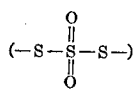

groups. By X-ray and neutron activation analyses, the polymer was found to contain 47.0 percent S and 6.4 percent O. The theoretical values for a dithiosulfurous ester polymer are 51.1 percent S and 8.5 percent O.

The polymer softened at 110° C. and completely melted to a very viscous liquid at 150° C. The polymeric melt spread as a thin film between two glass plates and then cooled gave a strong glass laminate. When stressed to the breaking point the glass fractured, but the glass particles remained firmly held by the polymer film.

(B) To a solution of 4.3 parts (0.06 mole) of p-benzenedithiol and 14.1 parts (0.18 mole) of pyridine in 360 parts of toluene stirred vigorously with a Waring Blendor was added in 5 minutes a solution of 7.1 parts (0.06 mole) of thionyl chloride in 360 parts of toluene. After stirring for another 20 minutes, the mixture was filtered and the solid polymer washed thoroughly with methanol and dried in vacuo at about 50° C. The resulting white polymer had substantially the same properties as that described in 1A.

(C) In a similar manner 4,4'-oxybisthiophenol, 4,4'-dithiodiphenylmethane, and 4,4'-dithiodiphenyl are substituted for p-benzenedithiol with advantageous results.

EXAMPLE II

To a solution of 525 parts (9.3 mole) of sodium hydrosulfide in 900 parts of methanol at 25–30° C. was added 589 parts (2.2 mole) of 4,4'-bis(chloromethyl)diphenyl ether. After stirring for a total of 3 hours, the alcohol was removed in vacuo at 25°–50° C. and the residue diluted with 500 parts of toluene. The 4,4'-bis(mercaptomethyl)diphenyl ether was separated from the insoluble salts and recovered as a clear, viscous liquid. It contained 24.4 percent S in accord with the calculated value for 2 mercaptomethyl groups per diphenyl ether moiety.

In a similar manner a number of other poly(mercaptomethyl)diphenyl ether were prepared from different chloromethyldiphenyl ethers. Based on the sulfur content, these polythiols contained an average of from 1.5 to 2.3 mercaptomethyl groups per diphenyl ether moiety.

(A) To 25.2 parts (0.17 mole based on —SH) of a poly(mercaptomethyl)diphenyl ether containing 21.6 percent S, an average of 1.65 mercaptomethyl group per diphenyl ether moiety, 40 parts (0.5 mole) pyridine and 450 parts of toluene was added gradually 11.8 parts (0.1 mole) of thionyl chloride in 180 parts of toluene. A white precipitate immediately formed. The reaction mixture was poured into excess aqueous alcohol and the insoluble resinous product recovered and air dried. During the drying, the surface of the polymer became pink in color. The resin had a softening point of 210° C. and became completely liquid at 230–250° C.

(B) In another run, 7.87 parts (0.053 mole —SH) of a poly(mercaptomethyl)diphenyl ether containing 21.6 percent S was condensed with 3.57 parts (0.03 mole) of thionyl chloride in the presence of 9.6 parts (0.12 mole) of pyridine and 550 parts of toluene using a high speed Waring Blendor. After 10 minutes, the toluene was decanted and the solid product washed with aqueous methanol. The granular polymer was recovered by filtration, rinsed with acetone, and dried at 90° C. in vacuo. There was obtained 8.6 parts of a cream-colored solid polymer having a melting point of 220°–240° C. and containing 25.3 percent S. Calculated for the dithiosulfite polymer: 27.7 percent S.

These poly(mercaptomethyl)diphenyl ether —SOCl₂ polymers were insoluble in all common solvents at room temperature and in refluxing toluene, methylene chloride, 1,1,2,2-tetrachloroethylene, or dimethylsulfoxide. Slight swelling was noticeable in refluxing nitrobenzene at 210° C. and in diphenyl ether at 235° C. The polymers are partially soluble in concentrated formic acid at 85° C. With concentrated sulfuric acid, the polymers became red at room temperature, dark brown at 70° C., and showed evidence of decomposition at 230° C.

The melted polymers are readily cast in a thin film which on cooling becomes a tough, hard coating with good adhesion to glass and many metals. A sample of the resin described in Example 2A was placed between two 1″ x 4″ test strips of 17-7 PH stainless steel with a ½″ overlap. The joint was heated at 230° C. at 2000 p.s.i. for 5 minutes and then cooled. The joint had a shear strength of 500–600 p.s.i. at room temperature when tested by the method of ASTM D–1002–53T.

EXAMPLE III

To a stirred solution of 17.0 parts (0.1 mole) of p-xylylenedithiol (M.P. 46–7° C.) and 24.0 parts (0.3 mole) pyridine in 400 parts of 1,2-dichloroethane is added at room temperature 11.8 parts (0.1 mole) of thionyl chloride diluted with 50 parts of 1,2-dichloroethylene. The precipitated resinous polymer is recovered, washed, and dried in vacuo. The white product is insoluble in most organic solvents and slowly discolors on exposure to air. The infrared spectrum of the discolored polymer provides evidence for the presence of both dithiosulfurous and dithiosulfuric ester groups.

I claim:
1. A resinous polymer prepared by condensation in the presence of an HCl acceptor of substantially equimolar proportions of thionyl chloride and an aromatic polythiol characterized by a formula selected from the group consisting of:

$$R(SH)_n \text{ and } R(CH_2SH)_n$$

where $n$ is 1.5–3.0,
the thiol groups are in non-adjacent positions on the aromatic moiety, and
R is selected from the group consisting of:

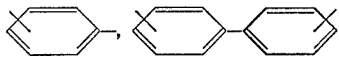

and

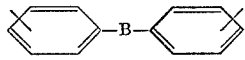

wherein B is of —O—, —S—, —SO$_2$—, —CH$_2$—, and —C(CH$_3$)$_2$—.

2. The resinous polymer of claim 1 wherein the aromatic polythiol is p-benzenedithiol.
3. The resinous polymer of claim 1 wherein the aromatic polythiol is p-xylylenedithiol.
4. The resinous polymer of claim 1 wherein the aromatic polythiol is 4,4-bis(mercaptomethyl)diphenyl ether.
5. The resinous polymer of claim 1 wherein the aromatic polythiol is a poly(mercaptomethyl)diphenyl ether having an average of 1.5 to 3.0 mercaptomethyl groups per diphenyl ether.

References Cited
UNITED STATES PATENTS

| | | | |
|---|---|---|---|
| 2,510,567 | 6/1950 | Flory | 260—78.4 |
| 2,969,387 | 1/1961 | Horn et al. | 260—481 |
| 3,015,670 | 1/1962 | Wolff | 260—453 |
| 3,053,816 | 9/1962 | Stone | 260—79.1 |

DONALD E. CZAJA, *Primary Examiner.*

M. I. MARQUIS, *Assistant Examiner.*